US012594530B2

(12) United States Patent
Bond

(10) Patent No.: US 12,594,530 B2
(45) Date of Patent: Apr. 7, 2026

(54) CAN MIXING DEVICE

(71) Applicant: Beyond CenterLine Solutions LLC, Colorado Springs, CO (US)

(72) Inventor: Richard Michael Bond, Colorado Springs, CO (US)

(73) Assignee: Beyond CenterLine Solutions LLC, Colorado Springs, CO (US)

( * ) Notice: Subject to any disclaimer, the term of this patent is extended or adjusted under 35 U.S.C. 154(b) by 666 days.

(21) Appl. No.: 18/054,771

(22) Filed: Nov. 11, 2022

(65) Prior Publication Data

US 2024/0157311 A1 May 16, 2024

(51) Int. Cl.

| | |
|---|---|
| ***B01F 31/20*** | (2022.01) |
| ***B01F 31/24*** | (2022.01) |
| ***B01F 33/501*** | (2022.01) |
| ***B01F 33/81*** | (2022.01) |
| *B01F 101/30* | (2022.01) |

(52) U.S. Cl.

CPC ............ *B01F 31/201* (2022.01); *B01F 31/24* (2022.01); *B01F 33/5011* (2022.01); *B01F 33/813* (2022.01); *B01F 2101/30* (2022.01)

(58) Field of Classification Search

CPC .... B01F 31/201; B01F 31/24; B01F 33/5011; B01F 33/50115

See application file for complete search history.

(56) References Cited

U.S. PATENT DOCUMENTS

| | | | | |
|---|---|---|---|---|
| 457,938 A * | 8/1891 | Schroeder | B01F 35/42 | 425/434 |
| 473,643 A * | 4/1892 | Schroeder | B01F 31/24 | 366/212 |
| 2,086,241 A * | 7/1937 | Schaerr | B01F 35/423 | 366/212 |

(Continued)

FOREIGN PATENT DOCUMENTS

| | | | |
|---|---|---|---|
| CN | 211246333 | 8/2020 | |
| WO | WO-0033951 A1 * | 6/2000 | B01F 31/201 |

OTHER PUBLICATIONS

THEPERFECTCOLLECTION, DIY Spray Paint Can Shaker, YouTube, Apr. 19, 2016, available at: https://www.youtube.com/watch?v=4JzsH_Ed9Tw.

(Continued)

*Primary Examiner* — Marc C Howell

(74) *Attorney, Agent, or Firm* — Briggs IP; Jeremy A. Briggs

(57) ABSTRACT

A can mixing device is disclosed. The device may include a base plate having a base plate proximal surface and a base plate distal surface. The device may further include a first rod having a first rod proximal end and a first rod distal end. The first rod distal end may be attached to a center portion of the base plate proximal surface. The device may further include a top plate having a first hole in a top plate center portion. The top plate may be configured to slide along a first rod length through the first hole. Further, the top plate may be attached to the first rod proximal end via a fastening (Continued)

member. Furthermore, the device may include a connection member attached to the base plate distal surface. The connection member may be configured to removably couple with a power tool configured to generate a device reciprocating movement.

20 Claims, 5 Drawing Sheets

(56) References Cited

U.S. PATENT DOCUMENTS

| | | | | | |
|---|---|---|---|---|---|
| 4,090,612 | A * | 5/1978 | Lostutter | B44D 3/003 211/13.1 |
| 4,883,644 | A * | 11/1989 | Perlman | B01F 31/201 422/310 |
| 5,707,861 | A * | 1/1998 | Sherman | C12M 47/06 422/550 |
| 5,711,601 | A * | 1/1998 | Thomas | B01F 35/423 366/217 |
| 6,302,575 | B1 | 10/2001 | Anderson et al. | |
| 7,997,787 | B2 | 8/2011 | Blair | |
| 8,142,067 | B2 * | 3/2012 | Dorado Gonzalez | B01F 31/24 366/112 |
| 8,834,014 | B2 | 9/2014 | Summons et al. | |
| 9,664,431 | B2 * | 5/2017 | Mullen | B01L 9/06 |
| 2016/0175790 | A1 * | 6/2016 | McCarley | B01F 31/24 366/211 |

OTHER PUBLICATIONS

Projects with Rich, The Ultimate Spray Paint Can Shaker—Homemade DIY Tool, YouTube, available at: https://www.youtube.com/watch?v=JYihlUEg2vc.

Ubuy, “CANQUAKE Spray Paint Can Shaker Powered by Your Reciprocating Saw Use with up to 3 cans”, retrived on Sep. 21, 2022, 6 Pages, available at: https://www.ubuy.co.in/product/2PSVO1QY-canquake-spray-paint-can-shaker-powered-by-your-reciprocating-saw-use-with-up-to-3-cans.

* cited by examiner

CAN MIXING DEVICE

TECHNICAL FIELD

The present disclosure relates to a can mixing device, and more specifically to an adjustable multi-can mixing device configured to mix can ingredients by using a power tool.

BACKGROUND

Users typically shake liquid or aerosol paint cans before applying paint to a surface. Users shake the cans to ensure that paint ingredients, which separate over time, evenly mix with each other prior to paint's application to the surface. The users are required to shake the cans vigorously as the paint ingredients settle over time, especially if the cans are not used for a long period.

There exist commercial paint shakers that shake large paint containers. While the commercial paint shakers may provide benefit to large establishments, such paint shakers have limited utility for retail users. Retail users typically use small liquid or aerosol paint cans, which may vary in size. Therefore, the commercial paint shakers, which are usually expensive, bulky and designed to shake large containers, have limited utility for the retail users.

In the absence of small paint shakers, retail users shake the cans manually before using the cans for paint application. Manual can shaking may cause inconvenience to the users, especially if the users shake the cans vigorously. Further, manual can shaking may result in uneven mixing of paint ingredients, and may thus lead to poor paint job.

Thus, there is a need for a can mixing device that may enable retails users to shake small liquid or aerosol paint cans, with minimal manual effort.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed towards a can mixing device. The device may be configured to house one or more cans of varying sizes or dimensions, and shake the cans to mix can ingredients. The cans may be liquid or aerosol paint cans. Specifically, the device may be configured to couple with a power tool, e.g., a hand-held reciprocating saw, which may generate device reciprocating movement when a user activates the power tool. Responsive to activating the power tool, the device may shake the cans and thus mix the can ingredients.

The device may include a base plate on which the device user may place/mount the cans. Specifically, the device user may place the cans on a base plate proximal surface. A base plate distal surface may be attached to a connection member that may be configured to removably couple with the power tool. The connection member may be a standard blade-end connection structure that may couple with a conventional reciprocating saw.

The device may further include a first rod that may be attached perpendicularly to the base plate. Specifically, a first rod distal end may be attached to the base plate proximal surface. Further, a first rod proximal end may include a threaded portion. Furthermore, the device may include a top plate having a first hole in a top plate center portion. The top plate may be configured to slide along a first rod length through the first hole. The top plate may attach/fasten to the first rod proximal end via the threaded portion by using a fastening member.

The user may slide the top plate up or down, along the first rod length, to securely hold cans of different heights between the top plate and the base plate. The user may fasten the top plate to the first rod proximal end when the cans are securely held between the top plate and the base plate. The user may activate the power tool to mix the can ingredients when the user fastens the top plate to the first rod proximal end.

The present disclosure discloses a can mixing device that enables the user to mix the can ingredients with minimal manual effort. The device may be configured to shake cans of different sizes. Further, the device may simultaneously shake one or more cans. Furthermore, the device may operate by the use of a conventional or standard power tool, such as a reciprocating saw, and does not require a customized power tool.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

Figure 1:
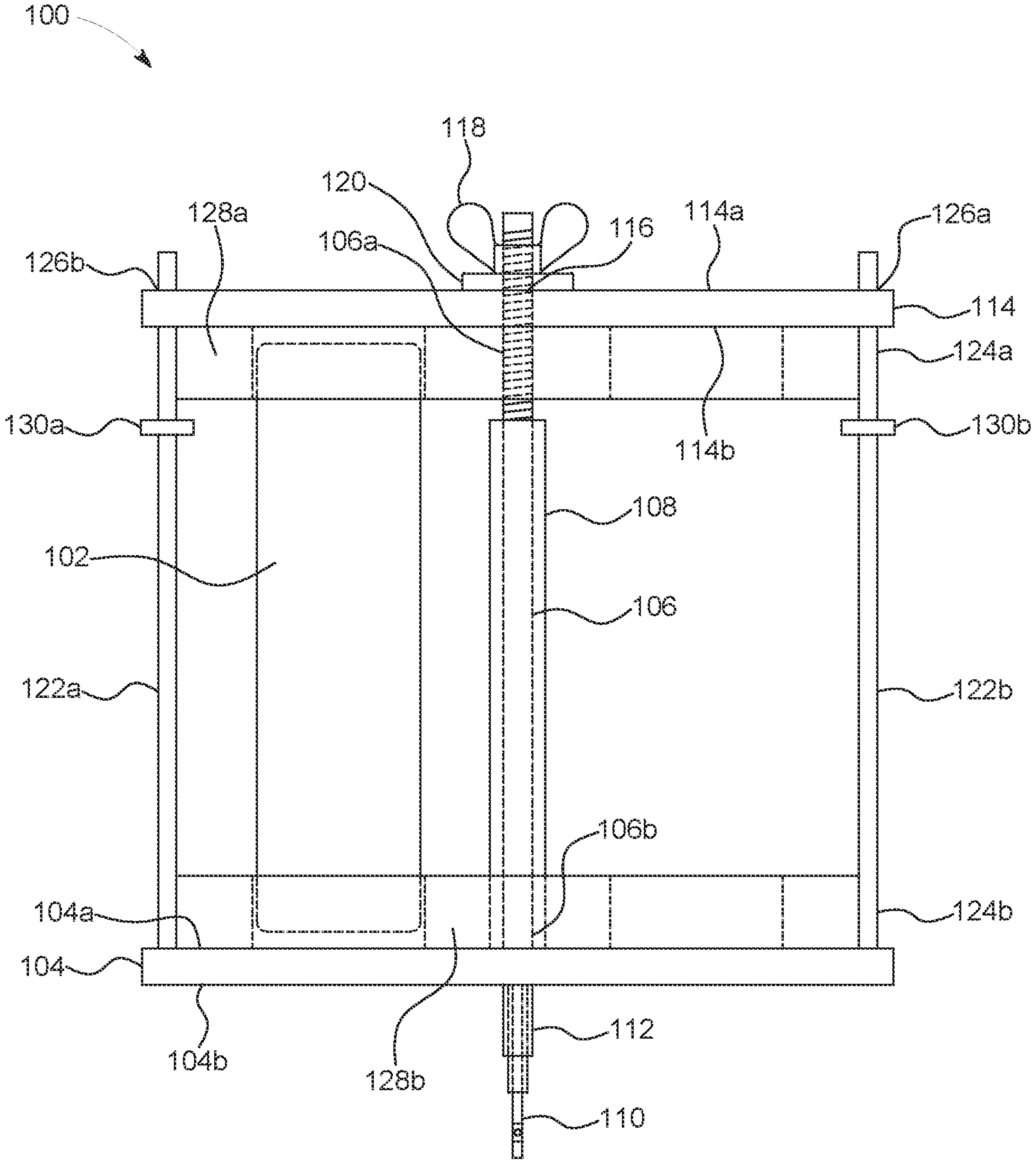
FIG. 1 depicts an example can mixing device in accordance with the present disclosure.

FIG. 1 depicts an example can mixing device 100 in accordance with the present disclosure. While explaining FIG. 1, reference may be made to FIG. 2.

The device 100 may be configured to removably couple with a power tool, e.g., a hand-held reciprocating saw (not shown), which may generate device 100 reciprocating movement when a user activates the power tool. Specifically, the device 100 may be configured to house one or more cans or containers 102 (or a can 102) and mix can ingredients when the power tool generates the device 100 reciprocating movement (i.e., shakes the device 100). In some aspects, the can 102 may be a liquid or an aerosol paint can. The can 102 may be of any size, dimension or shape. In an exemplary aspect, the can 102 may be cylindrical in shape, with a length in a range of 8 to 10 inches and a diameter in a range of 2 to 4 inches. Although FIG. 1 depicts one can 102, the device 100 may be configured to house multiple cans and shake the multiple cans simultaneously. Further, the device 100 may be configured to house cans of varying sizes and shapes.

The device 100 may include a base plate 104 having a base plate proximal surface 104*a* and a base plate distal surface 104*b*. The base plate 104 may be made of wood, plastic, metal such as steel, copper, aluminum, iron, or a combination thereof. The base plate 104 may be circular, oval, square, rectangular, pentagonal or hexagonal in shape. Further, in an exemplary aspect, the base plate 104 may have a thickness in a range of 0.25 to 0.5 inches. In addition, the base plate 104 may have a metallic or a paint coating to form a glass-smooth finish.

The device 100 may further include a first rod 106 having a first rod proximal end 106*a* and a first rod distal end 106*b*. In some aspects, the first rod 106 may be cylindrical in shape with a diameter in a range of 0.25 to 0.75 inches. In other aspects, the first rod 106 may be cuboidal in shape. The first rod 106 may have a length in a range of 10 to 12 inches, and may be made of metal such as steel, copper, aluminum, iron, or a combination thereof. Further, the first rod proximal end 106*a* may have a threaded portion. In particular, the first rod proximal end 106*a* may have an outer surface that may be threaded. In an exemplary aspect, a threaded portion length may be in a range of 2 to 4 inches. In other aspects, the first rod proximal end 106*a* may be a smooth surface (not shown in FIG. 1) and may not include the threaded portion.

The first rod distal end 106*b* may be attached or welded to a base plate proximal surface center portion. In some aspects (as shown in FIG. 1), the first rod distal end 106*b* may be attached or welded to the base plate proximal surface center portion. In other aspects, the base plate 104 may have a hole and the first rod distal end 106*b* may pass through the base plate 104 (e.g., a base plate width), and welded to the base plate 104 via the hole.

The first rod 106 may be attached to the base plate 104 in an arrangement such that the first rod 106 may be perpendicular to the base plate 104. Specifically, a first rod longitudinal axis may be perpendicular to a base plate plane, as shown in FIG. 1.

In further aspects, an elongated collar 108 may engulf the first rod 106 between the base plate 104 and a bottom end of the threaded portion. Specifically, the elongated collar 108 may cover the first rod 106 between the first rod proximal end 106*a* and the first rod distal end 106*b*. The elongated collar 108 may be formed of foam, molded plastic and/or the like, and may provide cushion and support to the first rod 106. The first rod 106 and the elongated collar 108 collectively form a rigid structure perpendicular to the base plate plane.

In some aspects, the device 100 may further include a connection member 110 that may be attached to the base plate distal surface 104*b*. The connection member 110 may be made of metal such as steel, aluminum, iron and/or the like. In other aspects, the connection member 110 may be attached to the first rod distal end 106*b* when the first rod distal end 106*b* passes through the base plate 104. In this case, the connection member 110 and the first rod 106 may form a unitary structure, and the connection member 110 may be formed of same material as the first rod 106.

In some aspects, the connection member 110 may be configured to removably couple with the power tool (e.g., the reciprocating saw) that the user may activate/use to shake the device 100. The connection member 110 may be a standard blade-end connection structure that may couple with a conventional reciprocating saw.

Figure 2:
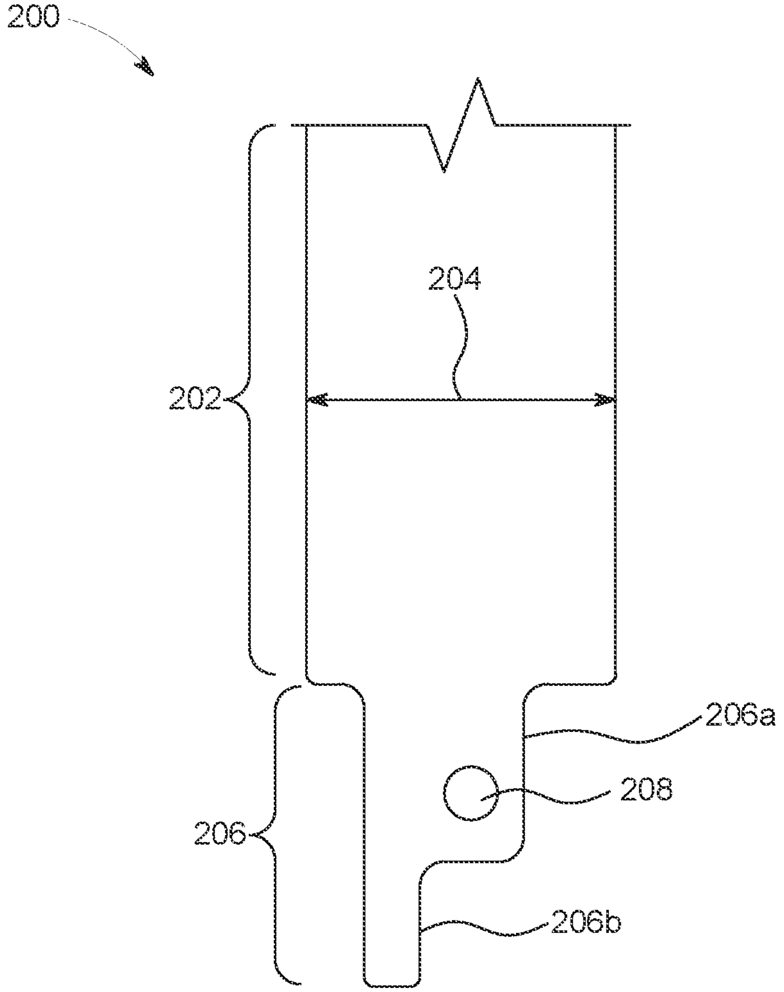
FIG. 2 depicts a front view of an example connection member in accordance with the present disclosure.

A connection member 110 side view is depicted in FIG. 1 and a connection member 110 front view is shown in FIG. 2. Specifically, FIG. 2 depicts a front view of an example connection member 200 (same as the connection member 110) in accordance with the present disclosure. In an exemplary aspect, the connection member 200 may have a top portion 202 having a width 204 in a range of 0.9 to 1.1 inches. Further, the connection member 200 may have a bottom portion 206 having a width less than the width 204. The bottom portion 206 may include a proximal portion 206*a* and a distal portion 206*b*. A proximal portion 206*a* width may be greater than a distal portion 206*b* width. Further, in an exemplary aspect, the distal portion 206*b* may have a thickness in a range of 0.1 inches to 0.15 inches. The proximal portion 206*a* may have a hole 208. In an exemplary aspect, the hole 208 may have a diameter in a range of 0.2 to 0.3 inches. A person ordinarily skilled in the art may appreciate that the connection member 200 may be couple with the reciprocating saw via the hole 208.

In further aspects, the device 100 may include a support structure 112 that may engulf a portion of the connection member 110. The support structure 112 may have a width greater than the width 204, and may have a length smaller than a connection member length. In an exemplary aspect, the support structure 112 may have a length in a range of 1 to 2 inches. Further, the support structure 112 may have a thickness in a range of 0.2 to 0.3 inches. The support structure 112 may be made of metal such as steel or aluminum. The support structure 112 may be a single layered structure or a multi-layered structure (e.g., FIG. 1 shows a dual-layered support structure 112).

The support structure 112 may be attached to the base plate distal surface 104*b*. The support structure 112 may act as a positive stop for the base plate distal surface 104*b* and protect the base plate distal surface 104*b* from touching the reciprocating saw when the device 100 shakes (e.g., when the user activates the reciprocating saw). Stated another way, the support structure 112 creates a gap (along the support structure 112 length) between the base plate distal surface 104*b* and a reciprocating saw top-end (not shown), so that there is enough room for the base plate distal surface 104*b* to shake vertically along the first rod longitudinal axis without touching the reciprocating saw.

The device 100 may further include a top plate 114 having a top plate proximal surface 114*a* and a top plate distal surface 114*b*. The top plate 114 may be aligned parallel to the base plate 104 and perpendicular to the first rod longitudinal axis. The top plate 114 may be similar in shape, material and dimensions to the base plate 104. In some aspects, the top plate 114 may include a first hole 116 that may be formed at a top plate center portion, as shown in FIG. 1. The top plate 114 may be configured to slide vertically (up or down) along a first rod length (i.e., along the first rod longitudinal axis) through the first hole 116. Specifically, depending on a can 102 length, the user may slide the top plate 114 up or down and securely place the can 102 between the top plate 114 and the base plate 104.

In some aspects, the user may affix the top plate 114 to the first rod proximal end 106*a* (i.e., to the threaded portion) by using a fastening member 118. Specifically, the user may slide the top plate 114 along the first rod 106 length and fix a top plate 114 position based on the can 102 length (e.g., based on whether the can length is large or small). The user may then securely attach the top plate 114 to the first rod proximal end 106*a* by using the fastening member 118. In some aspects, the fastening member 118 may be a wing nut bolt, as shown in FIG. 1. In other aspects, the fastening member 118 may be of other types, e.g., hex standoff, bolt and nut, and the like. In further aspects, the fastening member 118 may be disposed on the top plate proximal surface 114*a*, as shown in FIG. 1. The device 100 may additionally include a lock washer and/or a flat washer 120 that may be disposed between the top plate proximal surface 114*a* and the fastening member 118. The lock washer and/or the flat washer 120 may enable the device user to securely affix the top plate 114 to the first rod proximal end 106*a*.

In an arrangement where the first rod proximal end 106*a* is a smooth surface (not shown in FIG. 1) and does not include the threaded portion, the top plate 114 may be configured to attach to the first rod proximal end 106*a* via other types of fastening members, such as a thumb screw or a rod lock (not shown).

The device 100 may further include a plurality of second rods 122*a*, 122*b* (collectively referred to as second rods 122 or guide rods 122). In an exemplary aspect, the device 100 may include two guide rods 122, as shown in FIG. 1. In other aspects, the device 100 may include three, four or more guide rods 122. The guide rods 122 may surround one or more cans 102.

Each guide rod 122 may include a guide rod proximal end 124*a* and a guide rod distal end 124*b*. The guide rods 122 may be attached or welded to the base plate proximal surface 104*a* via the guide rod distal ends 124*b*. The guide rods 122 may be perpendicular to the base plate 104 and the top plate 114, and parallel to the first rod 106. In some aspects, the guide rods 122 may be made of same material as the first rod 106. Further, in an exemplary aspect, the guide rods 122 may be cylindrical in shape with a diameter in a range of 0.15 to 0.3 inches. In other aspects, the guide rods 122 may be cuboidal in shape with a side dimension in a range of 0.15 to 0.3 inches.

In some aspects, the top plate 114 may include a plurality of second holes 126*a*, 126*b* (collectively referred to as second holes 126) and the top plate 114 may be configured to slide along the guide rod proximal ends 124*a* through the second holes 126. Specifically, the user may slide the top plate 114 along the first rod 106 length through the first hole 116 and the second holes 126. Further, the guide rod proximal ends 124*a* may pass through the second holes 126. In this manner, the user may conveniently slide the top plate 114 vertically (up or down) to adjust top plate 114 position based on the can length.

The guide rods 122 may provide support to the device 100 structure and make the device 100 sturdy and robust. Specifically, the guide rods 122 may ensure that the top plate 114 remains parallel to the base plate 104 and does not tilt, when the user shakes the device 100 by operating the reciprocating saw.

A person ordinarily skilled in the art may appreciate that device 100 may operate/vibrate efficiency even without the guide rods 122. While the guide rods 122 provide additional sturdiness to the device 100 structure, guide rod presence in the device 100 should not be construed as limiting the present disclosure scope.

In some aspects, the device 100 may additionally include a first can holding member 128*a* and a second can holding member 128*b*. The first can holding member 128*a* may be attached to the top plate distal surface 114*b* and the second can holding member 128*b* may be attached to the base plate proximal surface 104*a*. The first can holding member 128*a* and the second can holding member 128*b* may be formed from foam or molded plastic, and may have a width in a range of one to two inches.

The first can holding member 128*a* and the second can holding member 128*b* may be configured to securely hold (or "press") the can 102 when the user places the can 102 between the top plate 114 and the base plate 104, and fixes/fastens the top plate position by using the fastening member 118. In an exemplary aspect, the first can holding member 128*a* and the second can holding member 128*b* may include a plurality of cavities that may enable the user to conveniently place the can 102 top and bottom portions in the first and second can holding members 128*a*, 128*b*. The cavities may have a diameter of a standard liquid or aerosol paint can, which may be in a range of two to three inches. In other aspects, the first can holding member 128*a* and the second can holding member 128*b* may not include the plurality of cavities, and the user may "press" the can 102 between the first and second can holding members 128*a*, 128*b* to securely place the can 102.

In some aspects, the device 100 may further include one or more adjustable guide rod stops 130*a*, 130*b* (collectively referred to as guide rod stops 130) disposed on the guide rods 122. The guide rod stops 130 may be configured to slide vertically (up and down) along guide rod length and may provide support to the first can holding member 128*a*. Specifically, the guide rod stops 130 may be fixed (via a fastening means, not shown) in proximity to a first can holding member 128*a* distal surface and ensure that the first can holding member 128*a* does not move downwards (e.g., towards the base plate 104) when the user shakes the device 100 by using the reciprocating saw.

In additional aspects, the device 100 may not include the first can holding member 128*a* and the second can holding member 128*b*. In this case, the can 102 top and bottom portions may be placed between the top plate 114 and the base plate 104, such that the can 102 top portion may touch the top plate distal surface 114*b* and the can 102 bottom portion may touch the base plate proximal surface 104*a*.

In yet another aspect, the device 100 may include a cage (not shown) that may be configured to cover the device 100. The device user may cover the device 100 by using the cage when the device 100 is not in use or during operation. In some aspects, the cage may be rotatably connected with the base plate 104 or one of the guide rods 122 via a hinge, and may be configured to rotatably close or open via the hinge.

In operation, the user may place one or more cans 102 between the top plate 114 and base plate 104. The user may then move the top plate 114 downwards through the first hole 116 and the plurality of second holes 126, such that the cans 102 may be securely placed between the top plate 114 and base plate 104. The user may then fix/fasten the top plate 114 by using the fastening member 118. The user may then couple the connection member 110 to a power tool, e.g., a standard/conventional reciprocating saw. The user may activate the reciprocating saw to generate a device 100 reciprocating movement, and may thus shake the cans 102. In this manner, the user may shake the cans 102 by using a conventional reciprocating saw, with minimal manual intervention or effort.

Figure 3:
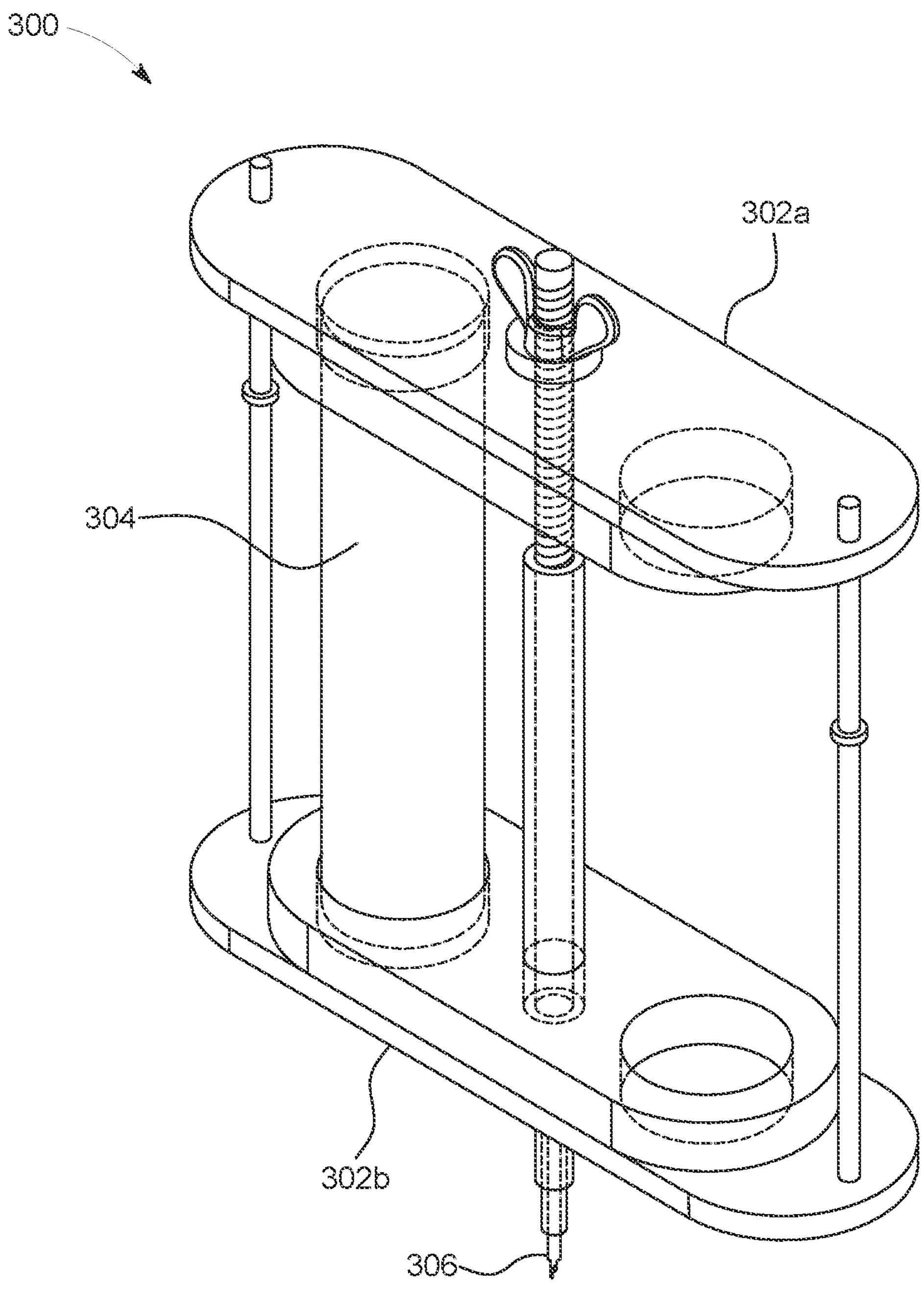
FIG. 3 depicts an isometric view of an example can mixing device with oval-shaped top and base plates, in accordance with the present disclosure.

FIG. 3 depicts an isometric view an example can mixing device 300 with oval-shaped top and base plates 302*a*, 302*b*, in accordance with the present disclosure. The device 300 may be same as the device 100. The top plate 302*a* and the base plate 302*b* may be same as the top plate 114 and the base plate 104 described above in conjunction with the device 100. In particular, as described above, the top plate 114 and the base plate 104 may be circular, oval, square, rectangular, pentagonal or hexagonal in shape. FIG. 3 specifically depicts an embodiment in which the device 300 includes oval-shaped top and base plates 302*a*, 302*b*.

The device 300 may be configured to house one or two cans 304 (same as the cans 102) between the top and base plates 302*a*, 302*b*. The device user may couple a connection member 306 (same as the connection member 110) with a reciprocating saw (not shown), and may active the reciprocating saw to shake the device 300.

Although FIG. 3 depicts one can 304, the user may use the device 300 by placing a two cans between the top and base plates 302*a*, 302*b*. Stated another way, the device 300 may work equally efficiently by placing one or two cans. Presence of one can 304, as shown in FIG. 3, should not be construed as limiting the present disclosure score.

Further, a person ordinarily skilled in the art may appreciate the device 300 may house more than two cans, by changing the top and base plate shapes. For example, the device 300 may house three or more cans by changing the top and base plate shapes to larger-sized square, rectangle, circle and the like.

Figure 4:
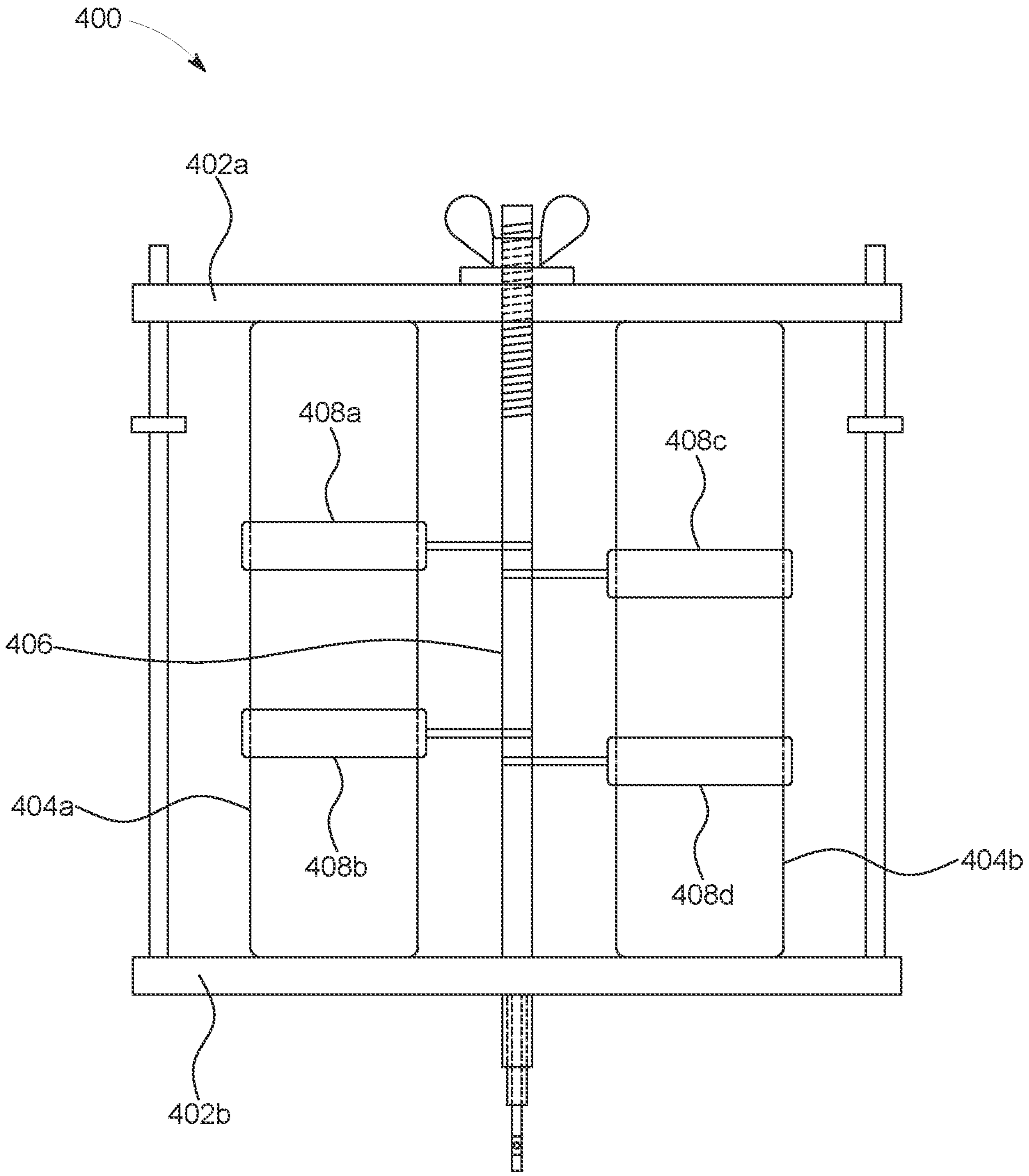
FIG. 4 depicts another example can mixing device in accordance with the present disclosure.

FIG. 4 depicts another example can mixing device 400 in accordance with the present disclosure. The device 400 may be similar to the device 100 and may include top and base plates 402*a*, 402*b*. The device user may securely place one or more cans 404*a*, 404*b* between the top and base plates 402*a*, 402*b*, as described above.

The device 400 may further include a first rod 406 (same as the first rod 106) that may include one or more clamps 408*a*, 408*b*, 408*c*, 408*d* (collectively referred to as clamps 408). In some aspects, the clamps 408 may be flexible C-clamps. The cans 404*a*, 404*b* may be removably attached to the first rod 406 by using the clamps 408. Although FIG. 4 depicts four clamps (two clamps for one can), in some aspects, the device 400 may include more or less clamps. For example, the device 400 may include two clamps (one clamp for each can).

A person ordinarily skilled in the art may appreciate that the clamps 408 map provide additional support to the cans 404*a*, 404*b* and ensure that the cans 404*a*, 404*b* do not move laterally, when the device 400 shakes vertically when the user activates the reciprocating saw. For example, when the user activates the reciprocating saw and the device 400 shakes vertically (due to reciprocating saw action/movement), the clamps 408 ensure that the cans 404*a*, 404*b* move along with the first rod 406 vertical movement and do not move tangentially/laterally.

In some aspects, the device 400 may not include an elongated collar, such as the elongated collar 108 described above, as the first rod 406 may include the clamps 408 that attach with the cans 404*a*, 404*b*. Further, the device 400 may or may not include can holding members, like the first can holding member 128*a* and the second can holding member 128*b*. For example, in the aspect depicted in FIG. 4, the device 400 does not include can holding members. In this case, the can top and bottom portions may directly contact the top and base plates 402*a*, 402*b*.

The remaining device 400 elements are similar to device 100 elements, and are thus not described again here for the sake of simplicity.

Figure 5:
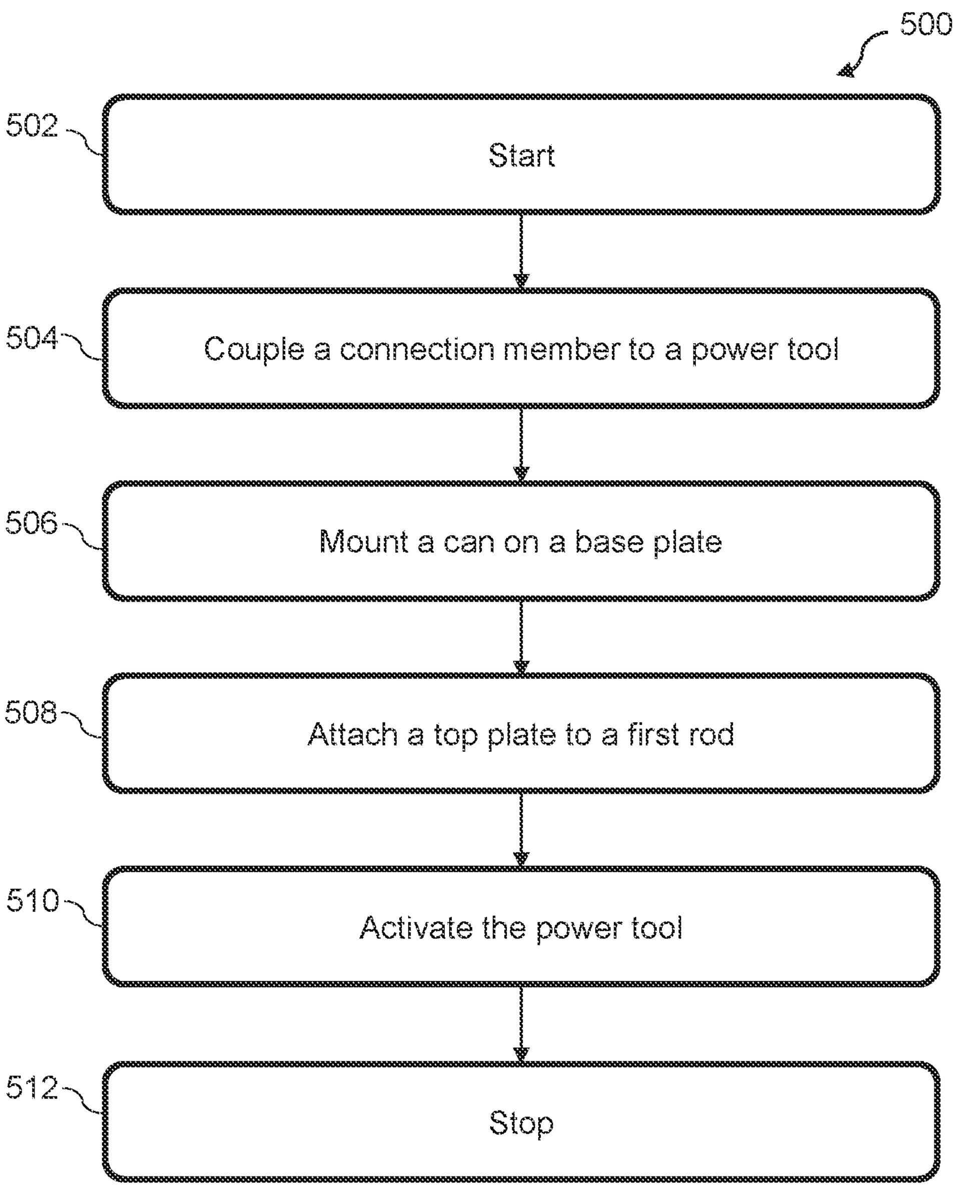
FIG. 5 depicts a flow diagram of a method for mixing ingredients of a can, in accordance with the present disclosure.

FIG. 5 depicts a flow diagram of a method 500 for mixing ingredients of the can 102, in accordance with the present disclosure. FIG. 5 may be described with continued reference to prior figures. The following process is exemplary and not confined to the steps described hereafter. Moreover, alternative embodiments may include more or less steps that are shown or described herein and may include these steps in a different order than the order described in the following example embodiments.

Referring to FIG. 5, at step 502, the method 500 may commence. At step 504, the method 500 may include coupling the connection member 110 to a power tool, e.g., the reciprocating saw. As described above, the connection member 110 may be attached to the base plate 104, specifically the base plate distal surface 104*b*.

At step 506, the method 500 may include mounting the can 102 on the base plate 104, specifically the base plate proximal surface 104*a*. At step 508, the method 500 may include attaching the top plate 114 to the first rod 106, specifically the first rod proximal end 106*a*, via the fastening member 118. As described above, the user may attach the top plate 114 to the first rod 106 such that the can 102 is securely placed or held between the base plate 104 and the top plate 114. At step 510, the method 500 may include activating the power tool to shake the device 100, and thus mix the can 102 ingredients.

At step 512, the method 500 may stop.

In some aspects, the steps described in FIG. 5 for the method 500 may be performed by any machine or a system, e.g., a robot.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A can mixing device comprising:
- a base plate having a base plate proximal surface and a base plate distal surface;
- a first rod having a first rod proximal end and a first rod distal end, wherein the first rod distal end is attached to a center portion of the base plate proximal surface;
- a top plate having a first hole in a top plate center portion and a plurality of second holes,
  - wherein the top plate is configured to slide along a first rod length through the first hole, and
  - wherein the top plate attaches to the first rod proximal end via a fastening member;
- a first can holding member attached to a top plate distal surface;
- a second can holding member attached to the base plate proximal surface,
  - wherein the first can holding member and the second can holding member are configured to securely hold a can;
- a plurality of guide rods having guide rod proximal ends and guide rod distal ends, wherein:
  - the guide rod proximal ends are configured to pass through the plurality of second holes,
  - each guide rod comprises a guide rod stop configured to slide along a guide rod length,
  - the guide rod stop is disposed in proximity to the first can holding member to prevent movement of the first can holding member towards the base plate; and
- a connection member attached to the base plate distal surface, wherein the connection member is configured to removably couple with a power tool configured to generate a can mixing device reciprocating movement.

2. The can mixing device of claim 1, wherein the first rod is perpendicular to the base plate and the top plate.

3. The can mixing device of claim 1, wherein the power tool is a reciprocating saw.

4. The can mixing device of claim 1, wherein the first rod proximal end comprises a threaded portion.

5. The can mixing device of claim 1, wherein the fastening member is a wing nut bolt.

6. The can mixing device of claim 1 further comprising an elongated collar configured to cover the first rod between the first rod proximal end and the first rod distal end.

7. The can mixing device of claim 1, wherein the guide rod distal ends are attached to the base plate proximal surface.

8. The can mixing device of claim 1, wherein the plurality of guide rods is parallel to the first rod and perpendicular to the base plate and the top plate.

9. The can mixing device of claim 1, wherein the first can holding member and the second can holding member comprises foam or molded plastic.

10. The can mixing device of claim 1, wherein the base plate and the top plate are circular in shape.

11. The can mixing device of claim 1, wherein the base plate and the top plate are oval in shape.

12. The can mixing device of claim 1, wherein the first rod is cylindrical in shape.

13. The can mixing device of claim 1, wherein the first can holding member and the second can holding member comprises a plurality of cavities to hold the can.

14. The can mixing device of claim 1, wherein the connection member is a standard blade-end connection structure configured to removably couple with a reciprocating saw.

15. The can mixing device of claim 1, wherein the guide rod stop is configured to be fixed on the guide rod via a fastener.

16. A can mixing device comprising:
- a base plate having a base plate proximal surface and a base plate distal surface;
- a first rod having a first rod proximal end and a first rod distal end;
- a top plate having a first hole in a top plate center portion and a plurality of second holes,
  - wherein the top plate is configured to slide along a first rod length through the first hole, and
  - wherein the top plate attaches to the first rod proximal end via a fastening member;
- a first can holding member attached to a top plate distal surface;
- a second can holding member attached to the base plate proximal surface,
  - wherein the first can holding member and the second can holding member are configured to securely hold a can;
- a plurality of guide rods having guide rod proximal ends and guide rod distal ends, wherein:
  - the guide rod distal ends are attached to the base plate proximal surface,
  - the guide rod proximal ends are configured to pass through the plurality of second holes;
  - each guide rod comprises a guide rod stop configured to slide along a guide rod length,
  - the guide rod stop is disposed in proximity to the first can holding member to prevent movement of the first can holding member towards the base plate; and
- a connection member located below the base plate distal surface, wherein the connection member is configured to removably couple with a reciprocating saw configured to generate can mixing device reciprocating movement.

17. The can mixing device of claim 16, wherein the plurality of guide rods is parallel to the first rod and perpendicular to the base plate and the top plate.

18. The can mixing device of claim 16 further comprising an elongated collar configured to cover the first rod between the first rod proximal end and the first rod distal end.

19. The can mixing device of claim 16, wherein:

the first rod distal end passes through the base plate, the first rod and the connection member form a unitary structure, and the connection member is a standard blade-end connection structure configured to removably couple with the reciprocating saw.

20. A method for mixing ingredients of a can, the method comprising:

coupling a connection member to a power tool, wherein the connection member is attached to a base plate, wherein the base plate comprises a base plate proximal surface and a base plate distal surface, wherein the base plate proximal surface is attached to a first rod, wherein the first rod comprises a first rod proximal end and a first rod distal end, and wherein the first rod distal end is attached to a center portion of the base plate proximal surface;

mounting the can on the base plate proximal surface;

attaching a top plate to the first rod proximal end via a fastening member, wherein the top plate comprises a first hole in a top plate center portion and a plurality of second holes, and wherein the top plate is configured to slide along a first rod length through the first hole; and wherein:

a first can holding member is attached to a top plate distal surface, a second can holding member is attached to the base plate proximal surface, the first can holding member and the second can holding member are configured to securely hold a can, a plurality of guide rods is configured to pass through the plurality of second holes, each guide rod comprises a guide rod stop configured to slide along a guide rod length, the guide rod stop is disposed in proximity to the first can holding member to prevent movement of the first can holding member towards the base plate, and activating the power tool to mix the ingredients of the can.

* * * * *